No. 867,375. PATENTED OCT. 1, 1907.
H. G. HUFFMAN.
CASE FOR DETACHABLE SEGMENT LENSES.
APPLICATION FILED APR. 15, 1905.
3 SHEETS—SHEET 1.
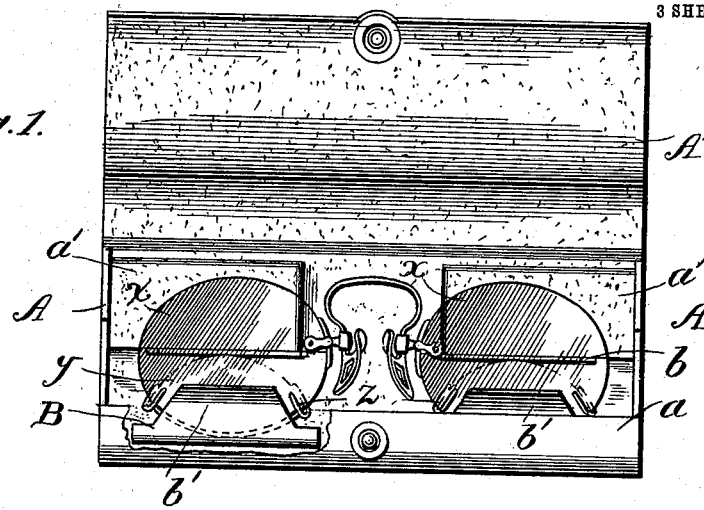
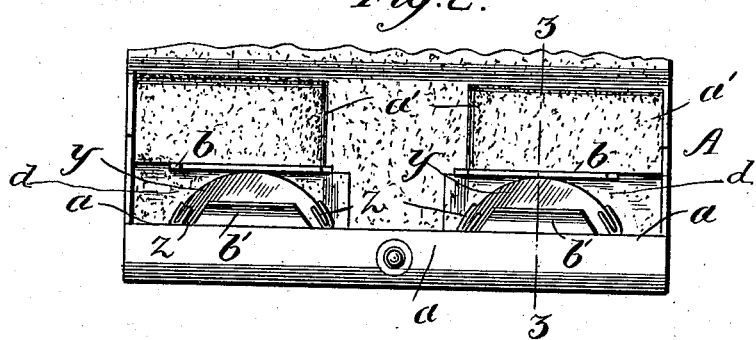
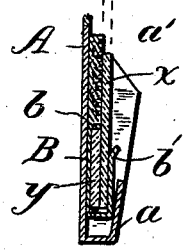
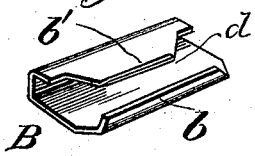
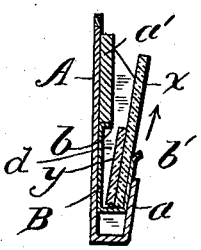
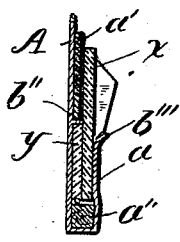
Witnesses
W. S. Rockwell
Nancey E. Costello
Inventor
H. G. Huffman
E. B. Clark
By
Attorney No. 867,375. PATENTED OCT. 1, 1907.
H. G. HUFFMAN.
CASE FOR DETACHABLE SEGMENT LENSES.
APPLICATION FILED APR. 15, 1905.
3 SHEETS—SHEET 2.
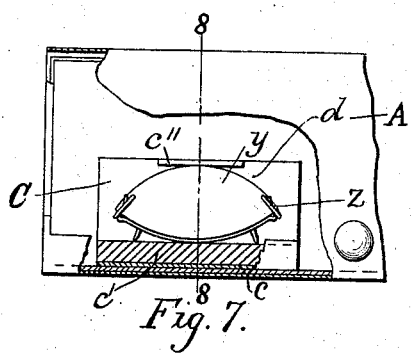
Fig. 7.
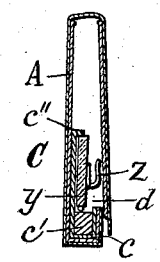
Fig. 8.
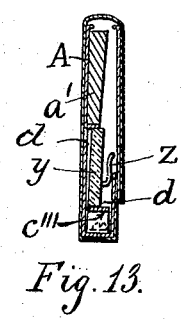
Fig. 13.
Fig. 9.
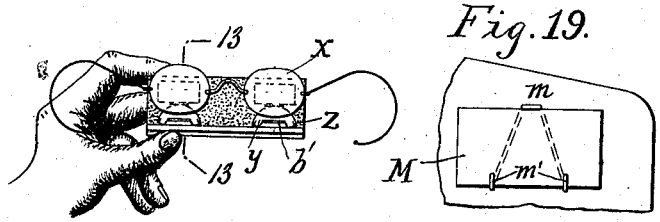
Fig. 19.
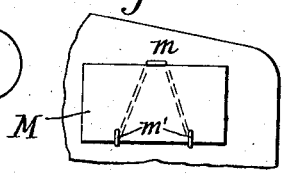
Fig. 10.
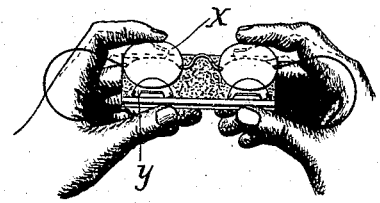
Fig. 20.
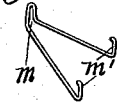
Fig. 11.
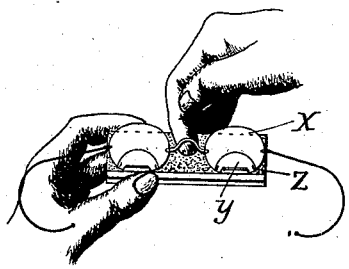
Fig. 12.
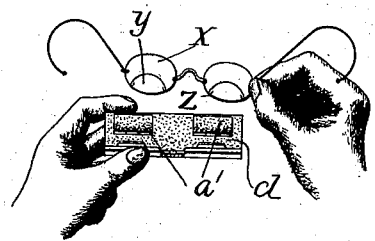
Witnesses.
W. E. Allen
W. Schornborn
Inventor.
H. G. Huffman
By E. F. Clark
Attorney.
THE NORRIS PETERS CO., WASHINGTON, D. C.

No. 867,375. PATENTED OCT. 1, 1907.
H. G. HUFFMAN.
CASE FOR DETACHABLE SEGMENT LENSES.
APPLICATION FILED APR. 15, 1905.

3 SHEETS—SHEET 3.

Witnesses
Phil. E. Barnes
Isabell Clark

Inventor
H. G. Huffman
E. B. Clark
Attorney

UNITED STATES PATENT OFFICE.

HARMAN G. HUFFMAN, OF YOUNGSTOWN, OHIO.

CASE FOR DETACHABLE SEGMENT-LENSES.

No. 867,375.  Specification of Letters Patent.  Patented Oct. 1, 1907.

Application filed April 15, 1905. Serial No. 255,816.

*To all whom it may concern:*

Be it known that I, HARMAN G. HUFFMAN, a citizen of the United States, residing at Youngstown, in the county of Mahoning and State of Ohio, have invented certain new and useful Improvements in Cases for Detachable Segment-Lenses, of which the following is a specification.

This invention relates to cases for detachable segment lenses and, more particularly, to engaging and supporting devices for such lenses in such cases.

The object of my invention is to provide simple and effective devices in a pocket case or box, for engaging and supporting, or holding, a segment lens, one or more, so that such lenses may be conveniently applied to, or detached from, the main lenses of a pair of eyeglasses or spectacles without fingering or handling the former.

Since the small detachable segment lenses are slippery and not easily held by the thumb and finger and adjusted on the main lenses; and also become soiled by handling, I have devised means for receiving and holding such segment lenses whereby they may be slipped on to the main lens, or detached therefrom and supported in the case without touching with the fingers.

The matter constituting my invention will be set forth in the claims.

I will now describe the details of construction of my invention by reference to the accompanying drawings, in which,—

Figure 14:
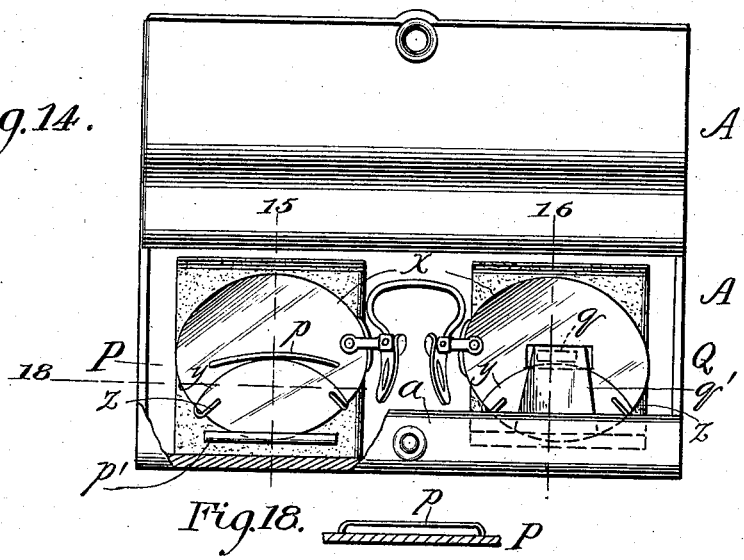
Figure 15:
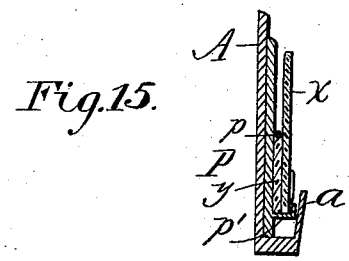
Figure 16:
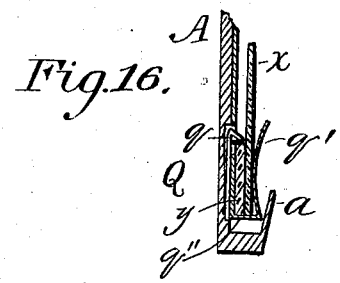
Figure 17:
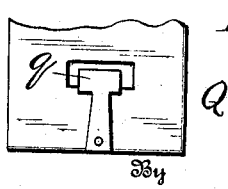

Figure 1 represents a top plan view of a pocket case with the lid open, showing receptacles and supporting devices for segment lenses and a pair of main lenses applied thereto. Fig. 2 represents a similar view with the eyeglasses or main lenses removed. Figs. 3 and 4 represent vertical sections on line 3—3, Fig. 2 showing the lenses in different positions. Fig. 5 represents a perspective view of a receptacle or supporting device for a segment lens. Fig. 6 represents a sectional view of a modified supporting device. Fig. 7 represents a top plan view of a case with the lid open, showing modified forms of supporting devices for segment lenses. Fig. 8 represents a section on line 8, Fig. 7. Figs. 9, 10, 11, and 12 represent plan or face views of cases for supporting detachable segment lenses and illustrate the manipulation of a pair of main lenses for applying the segments thereto without handling the latter. Fig. 13 represents a transverse section on enlarged scale on line 13, Fig. 9. Fig. 14 represents a plan or face view of an open case, partly in section, showing modified forms of supporting devices for segment lenses. Figs. 15 and 16 represent transverse sections on lines 15 and 16, Fig. 14. Fig. 17 represents a side elevation of part of the device shown in Fig. 16. Fig. 18 represents a longitudinal section on line 18, Fig. 14. Figs. 19 and 20 represent, respectively, a plan view and a perspective view of a modified form.

My invention for engaging and supporting segment lenses for bifocal eyeglasses may be constructed in various modified forms and applied in various ways to pocket cases, as will be pointed out and as illustrated in the accompanying drawings.

The case A, its cover $A^1$, and the pocket guard $a$, may be made in the usual well known manner except as modified to adapt the same to my invention.

Referring now, more particularly, to Figs. 1 to 6, inclusive, I will describe preferred forms of devices for engaging and supporting detachable segment lenses for bifocal glasses. To the bottom of the case and at the further edge thereof are applied two pads or cushions $a'$, one at each end, as shown in Figs. 1 and 2, for supporting the main lenses $x$. The front edge of this cushion may form a shoulder or abutment for engaging the upper edge of the segment lens $y$. To the bottom plate of the case may be soldered a small spring flange $b''$, Fig. 6, at the front edge of the cushion $a'$ as a bearing for engaging the upper edge of the segment lens.

I may provide a form B, composed of hard rubber, celluloid, or other resilient material, as an engaging and supporting device for the segment lens $y$. This form B is made with an upper spring flange $b$ and a lower spring lip $b'$, forming a receptacle or recess $d$ between them which will hold the segment lens $y$ and admit the lower half of the main lens $x$, as shown in Figs. 1 and 3. Two of these forms are secured in the case A in any well known manner and may be covered with velvet or other fabric. The upper flange $b$ is yielding and resilient, and the lower lip $b'$ is also sufficiently resilient to permit the segment lens $y$ to be pressed into the recess $d$, as shown in Figs. 2 and 3, and retained therein by spring pressure when the main lens $x$ is withdrawn. The spring lip $b'$ is curved outward to serve as a guide for the lenses and is tapered at the edges so as to project between the spring hooks $z$ at the corners of the segment lenses $y$.

Instead of using the form B, the front $a$ of the case may extend upward to form a spring lip $b'''$ and the bottom of the pocket filled with cork, rubber, or some other yielding or resilient material $a''$, as shown in Fig. 6. In this modified construction I preferably secure a small flange $b''$ to the back or bottom of the case A to form a resilient bearing for the top peripheral edge of the segment lens $y$. The resilient material at the bottom of the pocket may be a spring and the flange $b''$ may be rigid.

In the modification shown in Figs. 7 and 8, two forms

C may be applied to the case or box. The device C may be composed of a metal or celluloid form having a lower flange $c$ provided with an interior or upper cushion $c'$, Fig. 8, of rubber or other resilient material and an upper spring flange $c''$. This form may be covered with velvet or plush. The recess $d$ between the flanges $c$ and $c''$ is just sufficient to receive a segment lens when such flanges are slightly pressed apart. After the lens is pressed into place the flanges will engage its opposite peripheral edges and hold it in position. The frame or mounting of these lenses is, preferably, provided with two little prongs $z'$ which rest upon the rubber of the lower flange. These prongs also assist in handling the lens to prevent it from slipping in the fingers.

The device or form P, Figs. 14, 15 and 18, is constructed with an elastic wire $p$, having inwardly turned ends secured in the base in any well known manner, and with a lower flange $p'$ also secured to the base or back of the case.

The device or form Q is constructed with a spring hook, or latch $q$, riveted or otherwise secured to the base A, and with a flexible tongue $q'$, and lower bearing plate $q''$ as shown in Figs. 16 and 17. An opening may be made in the metal back of the form Q for the hook $q$ to work in, and in some instances the hook $q$ may be an integral part of the back of the form in case spring metal is used.

The device may be further modified by use of a pad or cushion M and a wire bent to form an upper spring loop $m$ and the lower turned up feet $m'$ at the lower edge of the cushion, as shown in Figs. 19 and 20. This device serves to engage the upper and lower peripheral edges of the segemnt lens between the loop $m$ and the feet $m'$.

The upper flanges or bearings $b$, $b''$, and $c''$, Figs. 2, 6, and 7 project substantially at right angles to the bottom of the case and are of a height corresponding closely to the thickness of a segment lens, so as to form with the lower flange or wall a shallow recess $d$ open at the front for receiving the segment lens, as shown in the drawings, and permitting a main lens $x$ to be freely slid over the exposed face of the segment and engaged with its hooks $z$, or disengaged therefrom. The upper and lower bearings $p$ and $p'$ Figs. 14, 15 and 18 also project substantially at right angles from the base or bottom of the case and provide a shallow recess between them with an open front for receiving a segment lens and permitting its convenient manipulation in connection with a main lens.

Evidently the upper bearing may be rigid and the lower bearing a spring or other resilient material, as $c'$, Fig. 8, or $c'''$, Fig. 13, since one rigid and one resilient bearing will suitably engage the opposite upper and lower peripheral edges of a segment lens and support the same in a favorable position to be applied to, or detached from, a main lens.

The operation of engaging the segment lenses $y$ with the main lenses $x$, and removing or disengaging them therefrom and leaving them in the supporting devices is very simple and convenient and may be performed without touching the segments with the fingers, as illustrated in Figs. 9, 10, 11, and 12. The segment lenses $y$ being in their receptacles or recesses $d$, as shown in Figs. 2 and 3, the eyeglasses may be grasped by the bridge and placed loosely in the case, as shown in Fig. 9, and then, by means of the index fingers bearing on the upper edges of lenses $x$, Fig. 10, they may be pressed down into the receptacles so as to engage with the spring hooks $z$; then by means of the index finger, Fig. 11, bearing under the bridge, the lenses $x$ are slightly inclined forward into the position shown in Fig. 4, thereby disengaging the edges of the segments from the upper bearings, when they may be removed from the supporting device, as shown in Fig. 12. When it is desired to replace the segments in the supporting device the main lenses carrying the segments are pressed down into the receptacles or recesses $d$ so as to cause the segment lenses to be engaged between the upper and lower yielding bearings and then the main lenses, while lying on the cushions $a'$, may be withdrawn, as indicated by dotted lines in Fig. 3, thus leaving the segment lenses in the supporting devices.

When using the device shown in Figs. 14, 15 and 18, it will be evident that the resilient wire $p$ may be sprung outwards sufficiently to permit the segment lenses $y$ to be inserted in the recess and held in place by pressure on its upper and lower peripheral edges.

In using the device shown in Figs. 16 and 17, the main lenses will be inserted in the recess while nearly level with the back of the case, thereby pressing down the hook $q$ which will engage the upper edge of the segment lens $y$ after the latter has been placed into its recess. The tongue $q'$ will be sufficiently flexible and resilient to be readily raised or bent outward for allowing the segment lens $y$ to be disengaged from the hook $q$, when it is desired to retain such segment on the lens, and remove the two together. The hook $q$ can be readily pressed back far enough to engage the upper edge of the segment, even though the bottom or lower flange $q'$ of the recess is rigid.

By means of my case fitted with supporting devices for segments an operator may be conveniently provided with a number of pairs of segment lenses of different powers, and a pair of segments may be quickly and effectively manipulated to attach them to, or detach them from, the main lenses without handling or soiling them with the fingers. The segments are also securely held in their recesses without danger of shaking about and scratching one another.

The mounting or frame of the segment lenses, having hooks for engaging it with a main lens, is not herein claimed as it is made the subject of a separate application, Serial Number 247,929, filed March 1, 1905.

Having described my invention, what I claim, and desire to secure by Letters Patent, is,—

1. A case for detachable segment lenses having upper and lower bearings, one of which is resilient, forming a shallow receptacle or recess between them open at the front and adapted to receive and bear upon upper and lower edges of a segment and permitting a main lens to be applied thereto without handling such segment.

2. In a case or box a supporting device for a segment lens comprising lower and upper bearings projecting from a base, and forming a shallow recess between them, one of said bearings being of a height corresponding approximately to the thickness of the lens and one of the bearings being resilient for engaging the opposite peripheral edges of a lens, and permitting a second lens to be applied thereto, substantially as described.

3. A case or box having a bottom pad or cushion at its rear portion for supporting a main lens, a bearing at the lower edge thereof, a lower resilient bearing at the front edge forming between the two a recess for a segment lens and a front guard-piece, substantially as described.

4. In a case or box, the combination with a pocket of a supporting device having means for engaging the upper and lower edges of a segment lens, and a segment lens having means for engaging it with a main lens, whereby such segment may be manipulated by the main lens, for attaching it to, or detaching it therefrom, substantially as described.

In testimony whereof I affix my signature in presence of two witnesses.

HARMAN G. HUFFMAN.

Witnesses:
C. W. GILGEN,
A. J. HUFFMAN.